INVENTORS
JAMES M. CALEHUFF
RALPH A. ENGLERT
SAMUEL W. METZGER
BY Robert E. Strausser
ATTORNEY Jan. 22, 1963  J. M. CALEHUFF ETAL  3,074,441
APPARATUS FOR THE MANUFACTURE OF FRAME GRIDS
Filed March 12, 1959  12 Sheets-Sheet 2
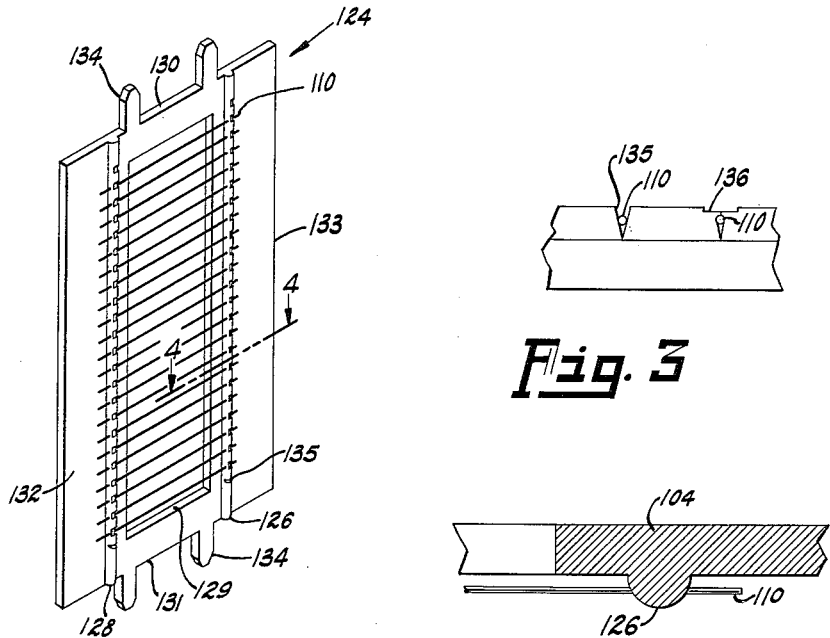
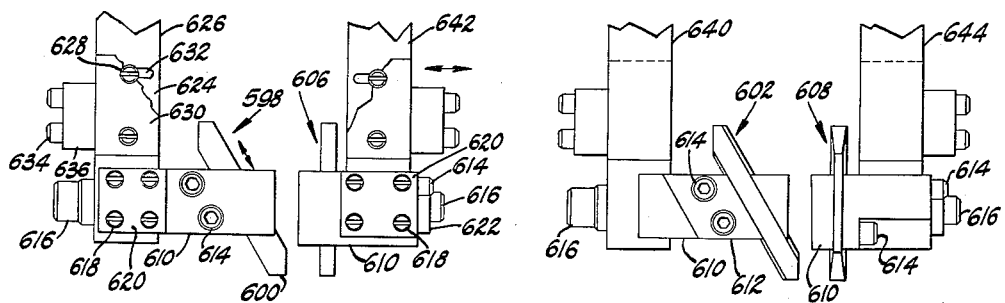
INVENTORS
JAMES M. CALEHUFF
RALPH A. ENGLERT
SAMUEL W. METZGER
BY Robert C. Strausser
ATTORNEY Jan. 22, 1963   J. M. CALEHUFF ETAL   3,074,441
APPARATUS FOR THE MANUFACTURE OF FRAME GRIDS
Filed March 12, 1959   12 Sheets-Sheet 4

INVENTORS
JAMES M. CALEHUFF
RALPH A. ENGLERT
SAMUEL W. METZGER
BY Robert C. Strausser
ATTORNEY

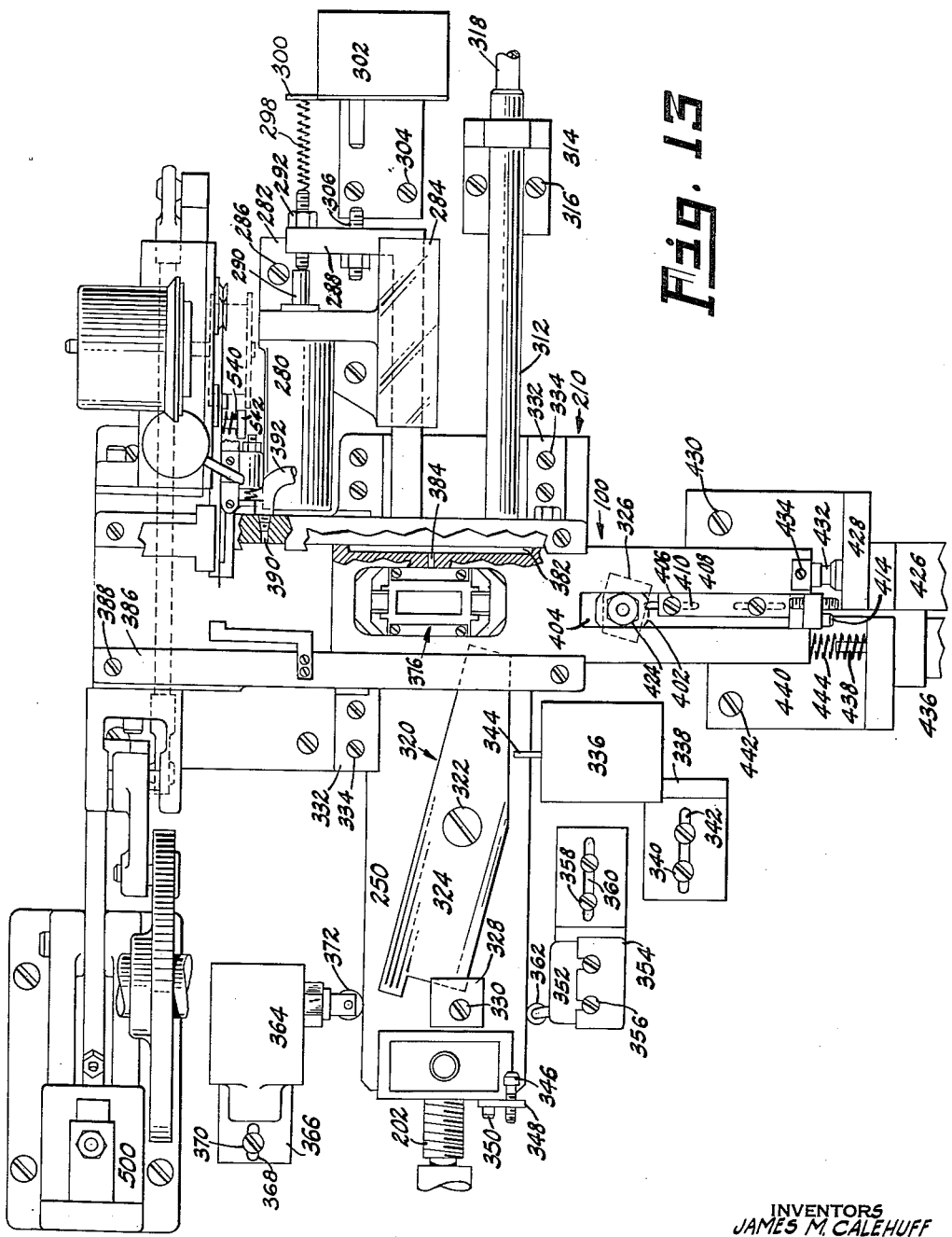

Jan. 22, 1963 J. M. CALEHUFF ETAL 3,074,441
APPARATUS FOR THE MANUFACTURE OF FRAME GRIDS
Filed March 12, 1959 12 Sheets-Sheet 7
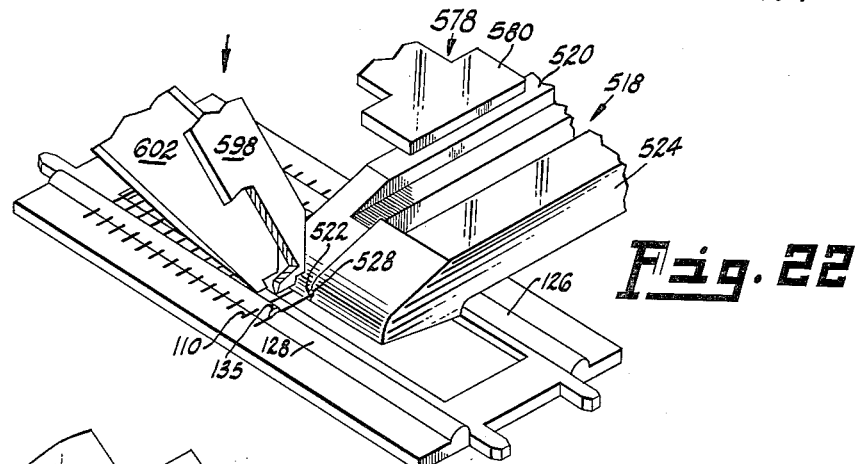
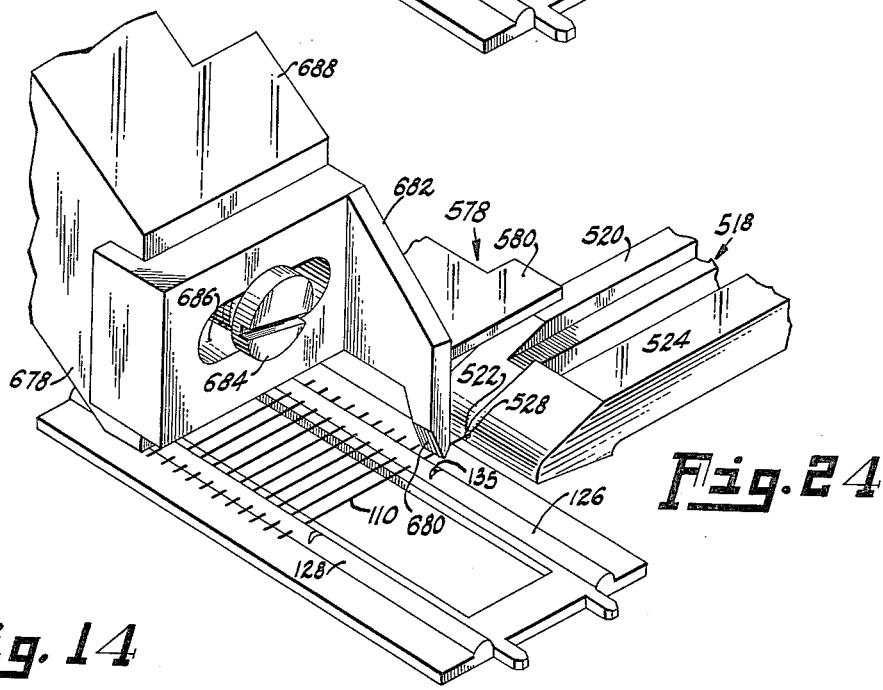
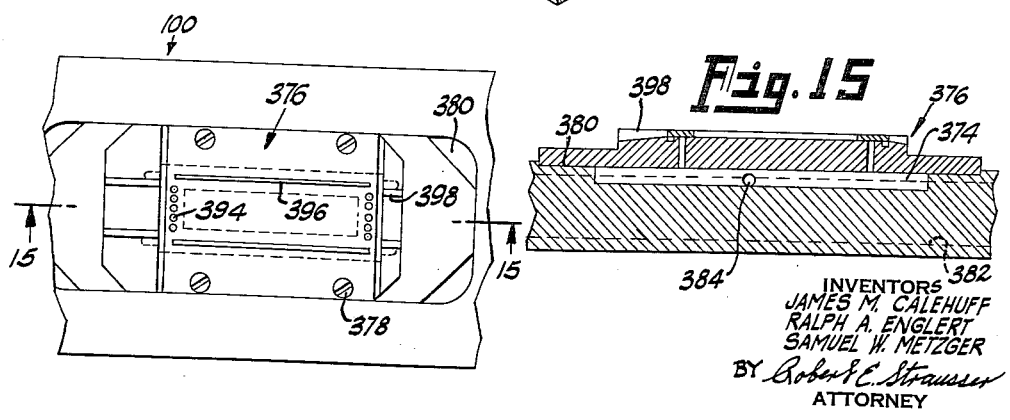
INVENTORS
JAMES M. CALEHUFF
RALPH A. ENGLERT
SAMUEL W. METZGER
BY Robert E. Strausser
ATTORNEY

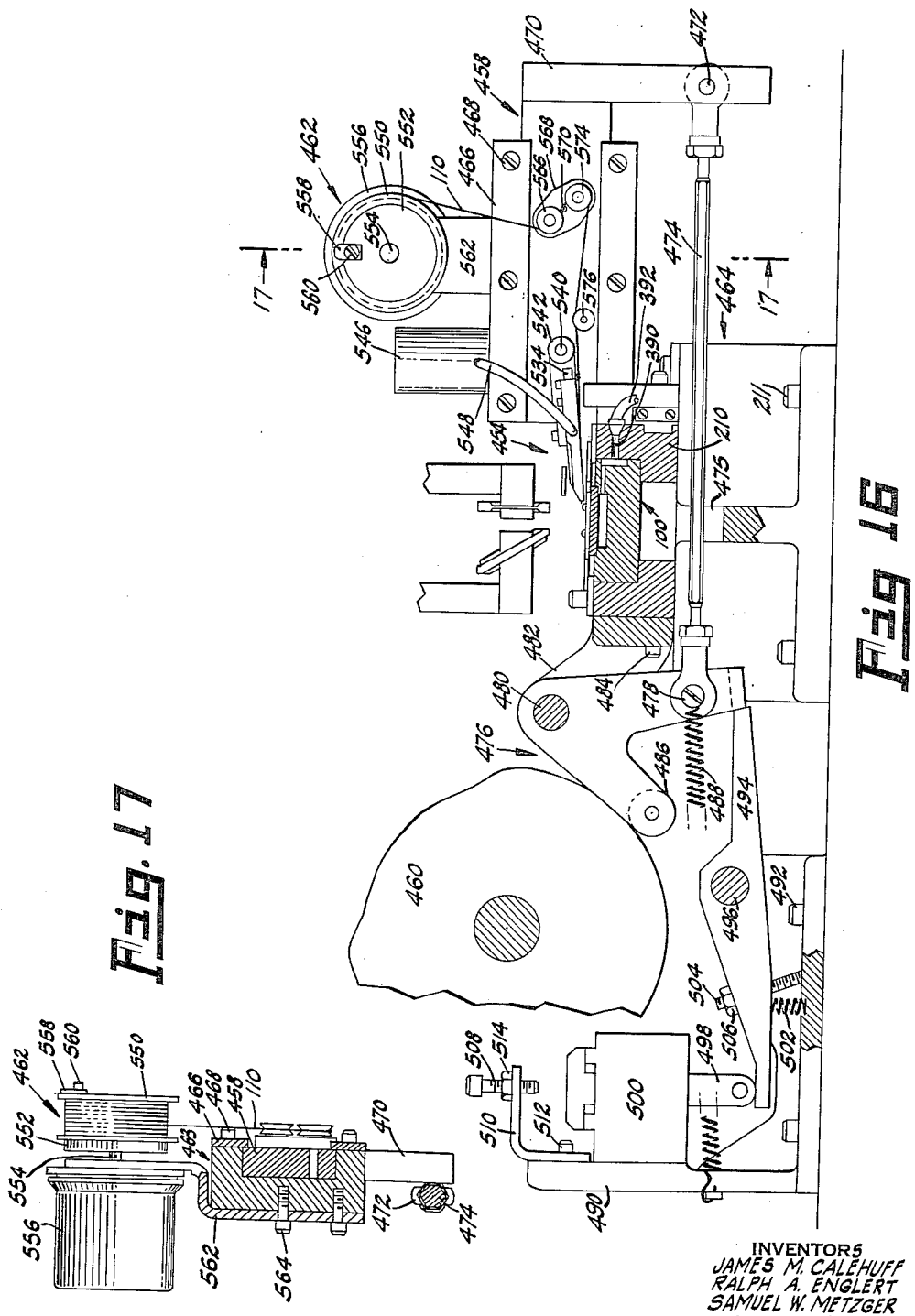

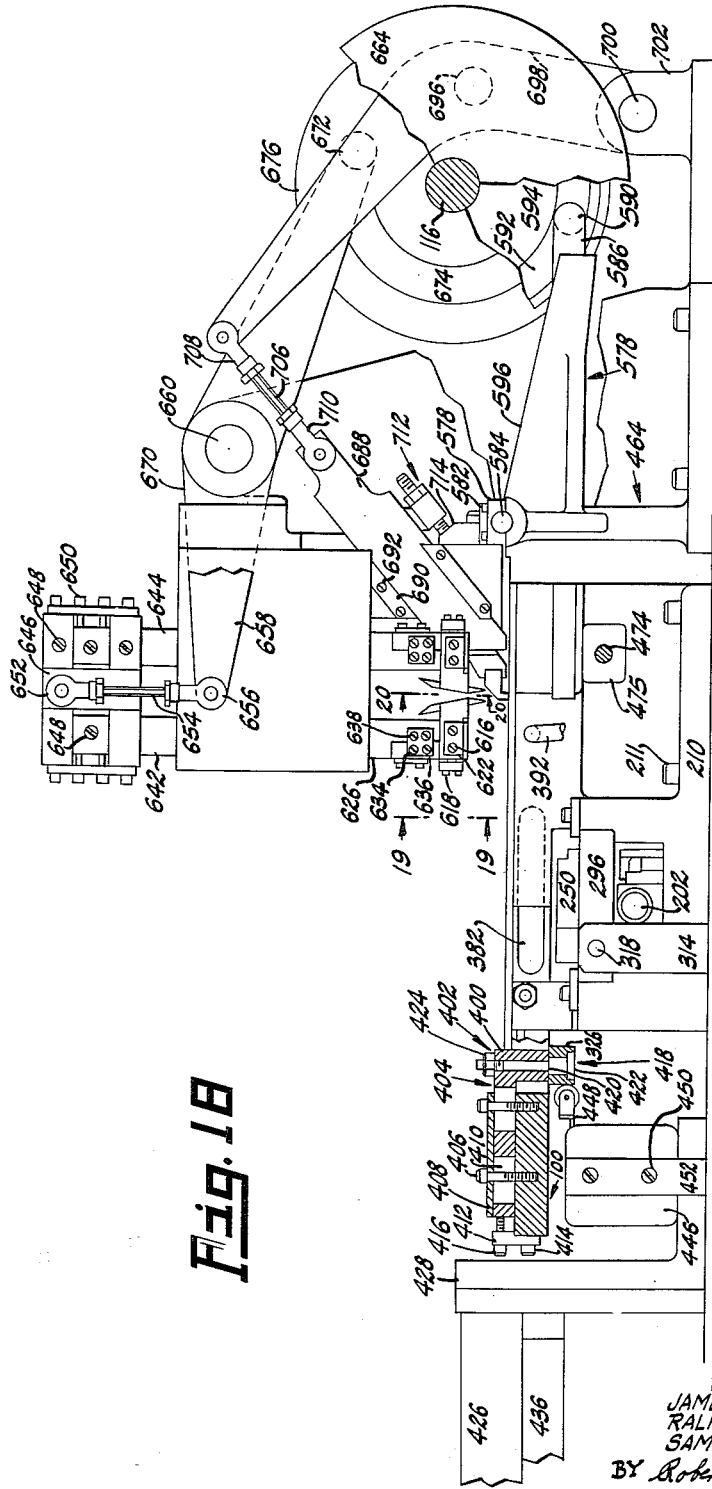

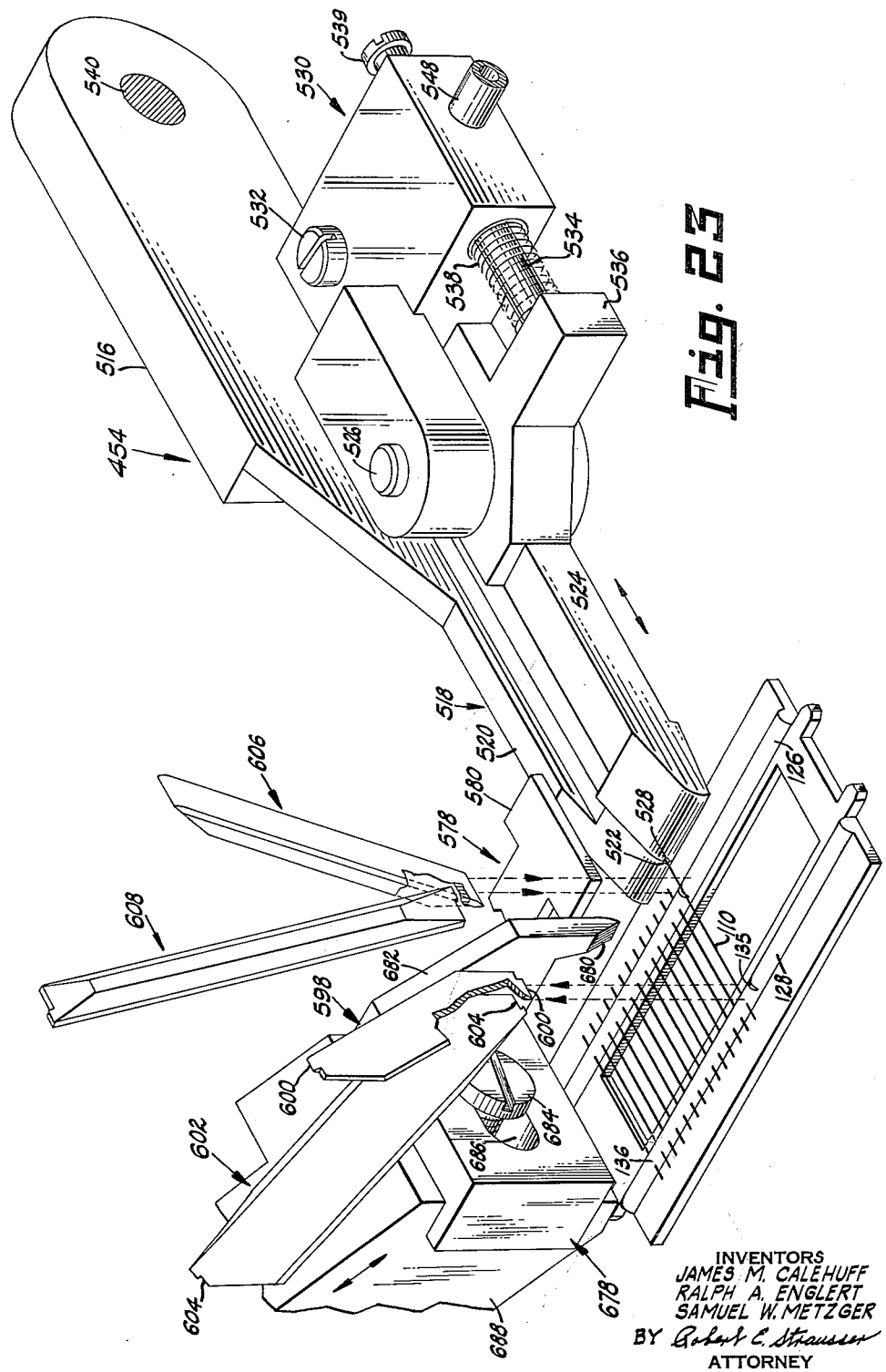

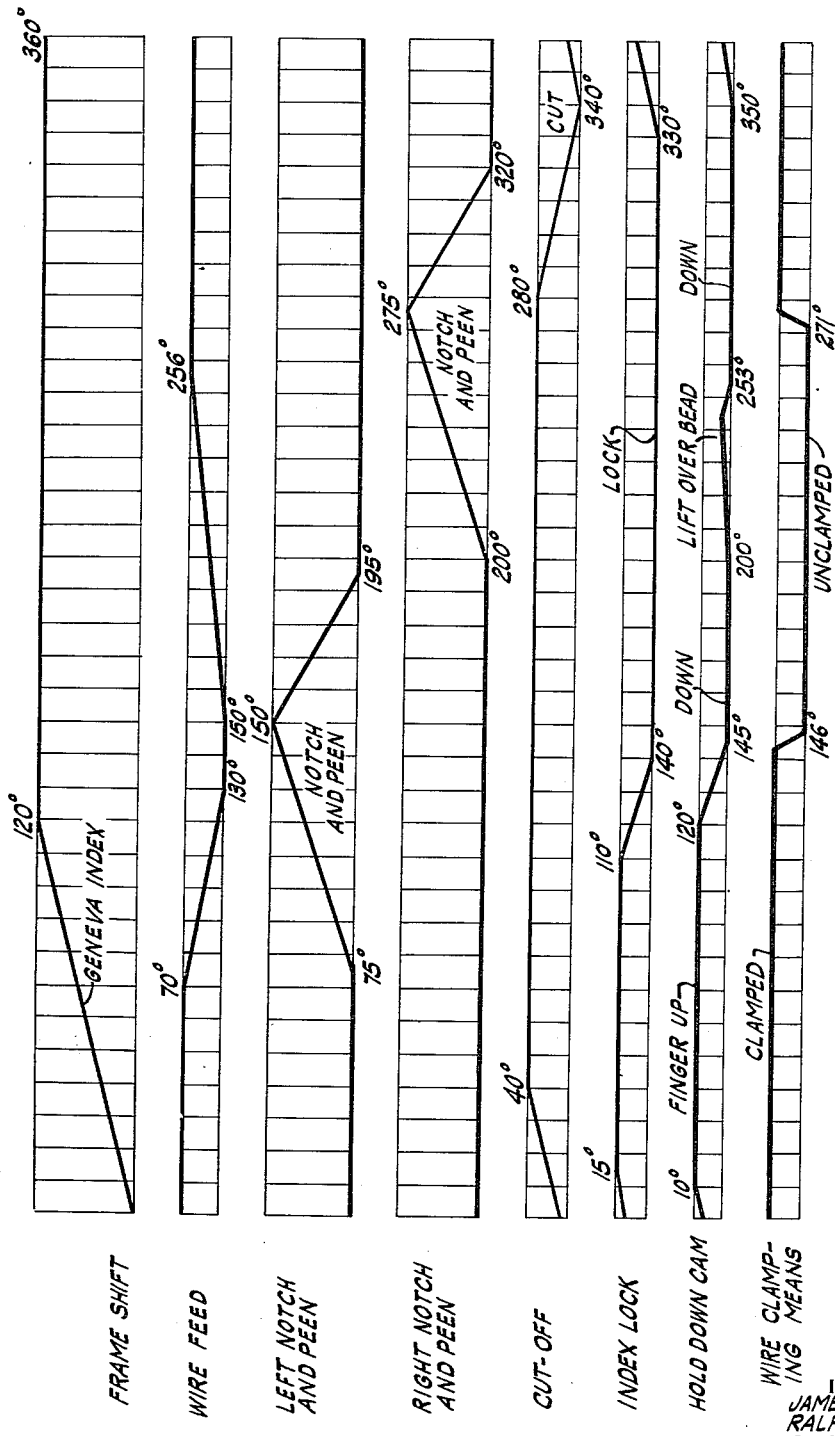

`United States Patent Office`

3,074,441
Patented Jan. 22, 1963

3,074,441
APPARATUS FOR THE MANUFACTURE OF FRAME GRIDS
James M. Calehuff, Montoursville, Ralph A. Englert, Jersey Shore, and Samuel W. Metzger, Cogan Station, Pa., assignors to Sylvania Electric Products Inc., a corporation of Delaware
Filed Mar. 12, 1959, Ser. No. 798,963
5 Claims. (Cl. 140—71.5)

This invention relates to an apparatus for the production of planar type grids which are particularly useful in the manufacture of certain electron discharge devices such as beam power amplifier tubes.

A major problem which has faced the electronics industry in connection with the use of beam power amplifier tubes is the overheating of the screen grid which causes secondary emission and sagging of the grid laterals causing life failures. In tubes of this type, which employ a plurality of grids interposed between the cathode and the anode, the alignment of the lateral wires of the succeeding grids in the array is extremely important. If the lateral wires are properly positioned, those of the subsequent grids beyond the control grid, i.e., screen grid particularly, will be shadowed by the lateral wires of the first grid or preceding grids. This shadowing of the grid from the electron stream emerging from the cathode during the tube operation results in a lowering of the exposure of the grid and of the current drawn by the grid and therefore allows a higher cathode to anode current without making unreasonable demands on the heat dissipating characteristics of the grid. Prior art methods and apparatus for manufacturing these grids lacked sufficient accuracy and stability for the continuous production of grids which had their lateral wires placed in position with extreme accuracy. Since the lateral wires in succeeding grids could not be aligned in production this reduced the shadowing effect which was obtained.

The apparatus of the present invention is uniquely adapted to the continuous high speed production of a plurality of planar grids wherein the lateral wire position on the grid frame and the spacings between lateral wires may be repetitiously accurately controlled. By means of this apparatus maximum utilization may be made of the shadowing effect since precise alignment of the lateral wires is achieved during the manufacture of the individual grids used in the array. A simple change in the grid holder allows other grids having various external configurations to be produced with only minor adjustments in the apparatus. Due to the use of this invention, complicated means for adjusting the position of the grid for attaining lateral wire line-up may be omitted in the tube structure itself, thus lowering the cost of the finished tube.

Another feature of this invention is that relatively heavy flat stock material may be utilized for the production of the grid frame thus increasing the stability of the grids produced over grids fabricated by previous conventional means. Due to the heavy structure of the grid frame, relatively high tension may be applied to the lateral wire during manufacture thus reducing, in part, problems caused by the sagging of the lateral wires which occurred at elevated temperature operation.

Thus an object of this invention is to improve the production of planar type grids.

Another object of this invention is to standardize the accuracy of lateral wire placement among various types of grids.

Another object of this invention is to enable placement of lateral wires across grid frames with uniform spacing between lateral wires on the frame and with a high degree of repeatability on succeeding frames.

Still another object of this invention is the reduction of lateral wire sagging during and after manufacture of a planar grid.

Yet another object of this invention is the placement of planar grid lateral wires parallel to one another and transverse to the longitudinal axis of the grid frame with a high degree of accuracy.

In one aspect of the invention an apparatus is provided which employs means for holding a grid frame having the desired configuration, means for attaching a lateral wire to the frame, means for sequentially moving the grid frame and placing subsequent lateral wires on the frame intermediate the sequential movements of the grid holder.

For a better understanding of the invention, reference is made to the following description taken in conjunction with the accompanying drawings in which:

FIG. 2 is a simplified enlarged perspective view of a frame grid produced by this apparatus;

FIG. 3 is an enlarged side view of a portion of the grid frame showing a notch formed in the bead, a lateral wire in place in the notch, and a lateral wire fastened or peened in the bead;

FIG. 4 is an enlarged section of the grid of FIG. 2 taken along a line 4—4 of FIG. 2;

FIG. 13 is a fragmentary plan view of the apparatus with some parts in section and other parts broken away showing the relation between the proportioning means and the carrier or grid frame holding means and the work station;

FIG. 14 is a fragmentary plan view of the grid frame holding means shown with a grid in outline indicating its placement;

FIG. 15 is a sectional view of the grid frame holding means of FIG. 14 taken alone a line 15—15 of FIG. 14 showing the suction cavity and outlets to the frame holding position.

FIG. 16 is a fragmentary end view of the grid frame holding means showing the lateral wire feeding mechanism in detail;

FIG. 17 is a detailed side view of the lateral wire tensioning device of FIG. 16 taken along a line 17—17 of FIG. 16;

FIG. 18 is a side view of the apparatus showing the relation of the notching tools, peening tools and cut-off mechanism;

FIG. 19 is an end view of the notching tools and holders of FIG. 18 taken along the line 19—19 of FIG. 18;

FIG. 20 is an end view of the peening tools and holders of FIG. 18 taken along a line 20—20 of FIG. 18;

FIG. 22 is a greatly enlarged perspective view showing a lateral wire positioned in a notch prior to the peening operation;

FIG. 23 is a view similar to FIG. 22 showing the lateral wire anchored in the frame at one end and positioned in the second notch prior to being anchored therein;

FIG. 24 is a perspective view similar to FIGS. 22 and 23 showing the lateral wier anchored in the first and second notches and the lateral wire severing means prior to its operation; and FIG. 25 is a cam chart showing in simplified form the sequence of operations performed by the apparatus during the placement of one lateral wire on a grid frame.

Figure 1:
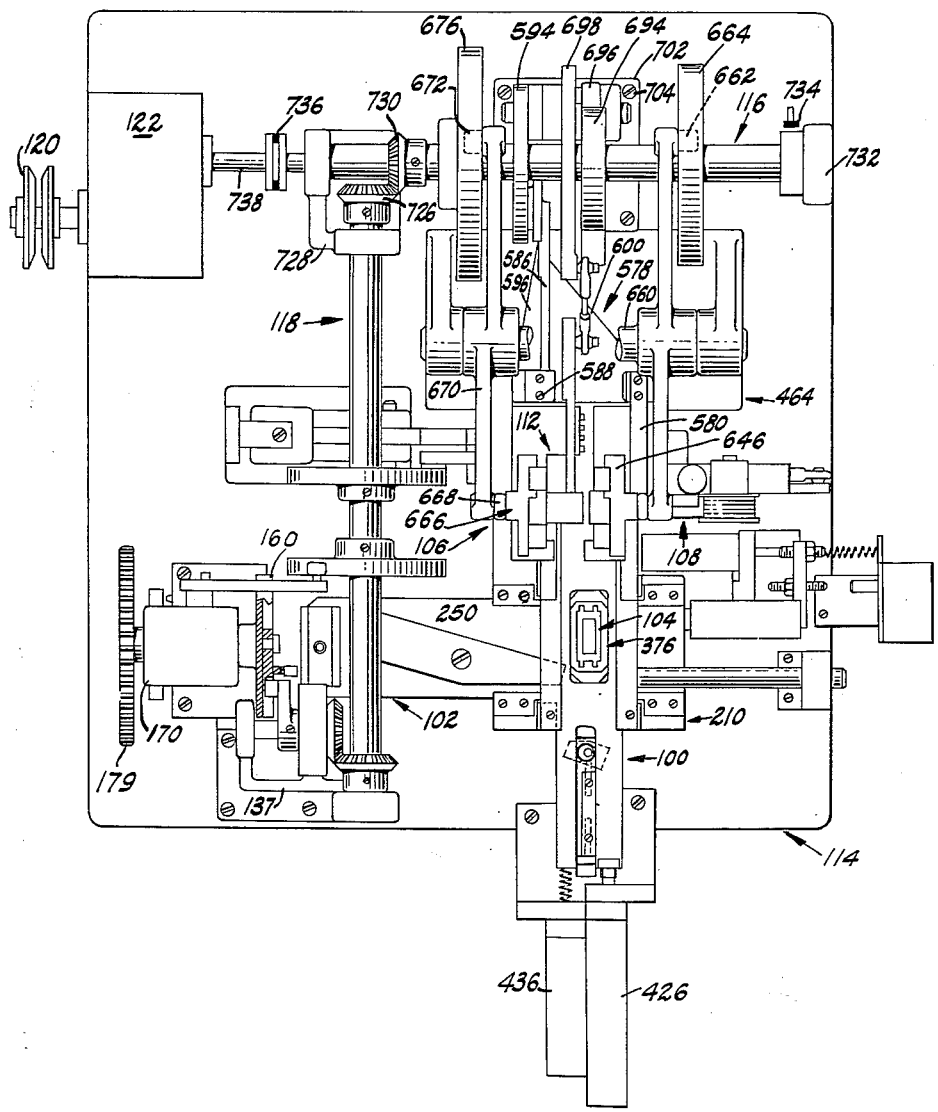
FIG. 1 is a plan view of the apparatus with some parts in partial section showing the general arrangement of the apparatus.

Referring to FIG. 1, in one embodiment of the invention a frame carrier 100 is provided which cooperates with movement proportioning means 102 to locate and advance a grid blank 104 while at the workstation 106. Wire feed means 108 at the workstation positions the lateral wire 110 across the frame blank to which it is attached by the fastening means 112. The various means are arranged in operative relation on a platform 114. The main drive shaft 116 and the secondary drive shaft 118 for the apparatus are also supported thereon. These drive shafts are coupled together and are driven by a motive source (not shown) through a pulley 120 and transmission 122.

FIG. 2 shows one type of frame grid or planar grid 124 which may be produced by the apparatus. The frame is fabricated from sheet metal which has been formed to provide a raised right bead 126, a raised left bead 128 and a central aperture 129 defined by top 130, bottom 131, and side portions 132, 133. Ears 134 are used to mount the grid in the finished electron discharge device. A lateral wire 110 is anchored in the beads, in this embodiment, by the closing of the notch 135 in the bead by a peening operation which deforms the metal of the bead as shown at 136 in FIG. 3 to anchor or lock the lateral wire in place. The depth of the notch 135 is such that when the wire is peened in place it will contact the frame only at the point of attachment to the bead as shown in FIG. 4. While the use of notching and peening will be described, it will be readily apparent to one skilled in the art that alternative means for fastening the lateral wires to the raised bead portions may be employed without departing from the scope of the invention.

*Indexing Means*

Figure 5:
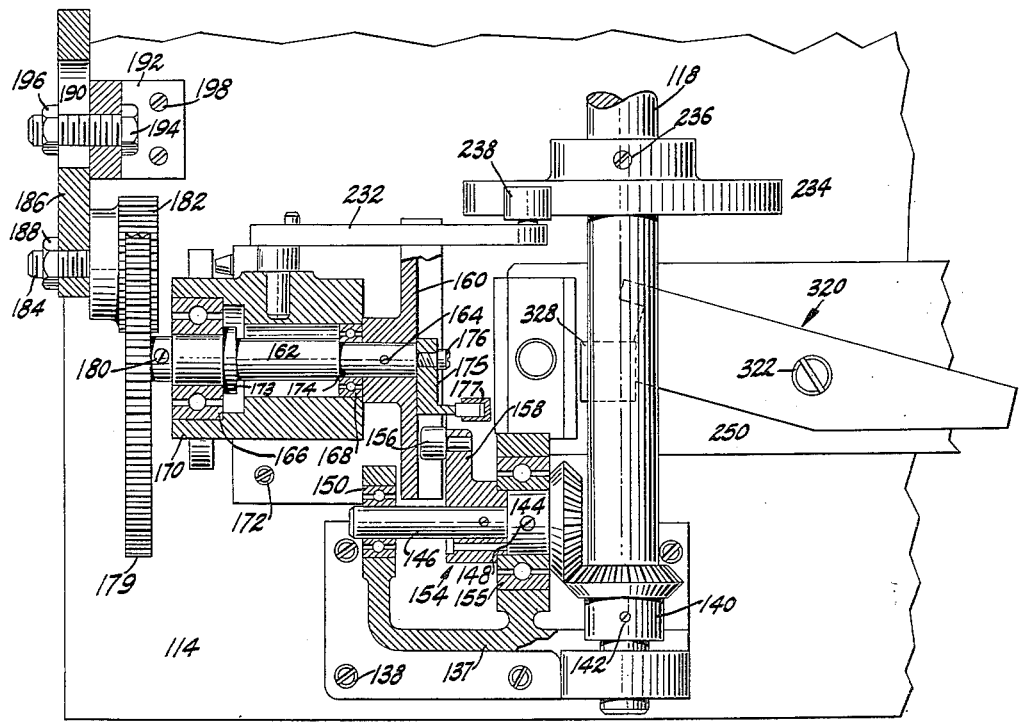
FIG. 5 is a plan view of a portion of the apparatus with parts sectioned and other parts omitted in the interest of simplicity and clarity showing the means employed to obtain the progressive step by step advance of the grid frame through the work station.

The sequential step by step movement of the frame carrier 100 is produced by the use of the movement proportioning means 102. This movement is derived from the rotation of the secondary drive shaft 118 one end of which is journaled in a support 137 as shown in FIG. 5. This support is attached to the platform 114 by screws 138. Adjacent the end of the shaft journaled in the support 137 is a miter gear 140 which is affixed thereto by a set screw 142. A complementary gear 144 is affixed to shaft 146 by set screw 148. The shaft 146 is supported at its ends in bearings 150, 155 in the support 137. Mounted intermediate the ends of the shaft 146 is a Geneva operator 154 which has a roller 156 affixed to its arm 158. This operator 154 drives the Geneva wheel 160 by means of the cooperating slots 161 (see FIG. 9) The Geneva wheel is affixed by a set screw 164 to one end of a shaft 162, which is carried by bearings 166, 168 in a support 170. The support 170 is fastened to the platform 114 by screws 172. The shaft 162 is provided with shoulders 173, 174 which serve to restrain its longitudinal movement. A cam 175 is attached to shaft 162 by a screw 176. This cam operates limit switch 177 which is attached to the support 170 by screws 178, FIG. 9. Spur gear 179 is mounted by a set screw 180 on the other end of the shaft 162 and meshes with an adjustable idler 182 (see FIG. 7). The idler gear 182 is mounted for rotation about bolt 184 which is secured to the arm 186 by a nut 188. Arm 186 is provided with a slot 190 which permits adjustable movement of the position of the idler gear. The arm is affixed to the bracket 192 by a bolt 194 which passes through the slot 190 and is tightened by nut 196. Bracket 192 is attached to the platform 114 by screws 198. The idler gear 182 meshes in turn with a gear 200 affixed to one end of the lead screw 202 by a key 204. A change of the driver gear 179 or the driven gear 200 will produce a different ratio through the idler gear 182 and thus produce a different amount of angular movement corresponding to a different number of lateral wires per inch.

The lead screw 202 is supported adjacent one end by a bearing 206 which is fixed in the support 170. The other end thereof is journaled in a block 208 which is part of the multiple slide way 210 which is in turn attached to the platform 114 by bolts 211.

*Index Screw Locking Means*

Figure 7:
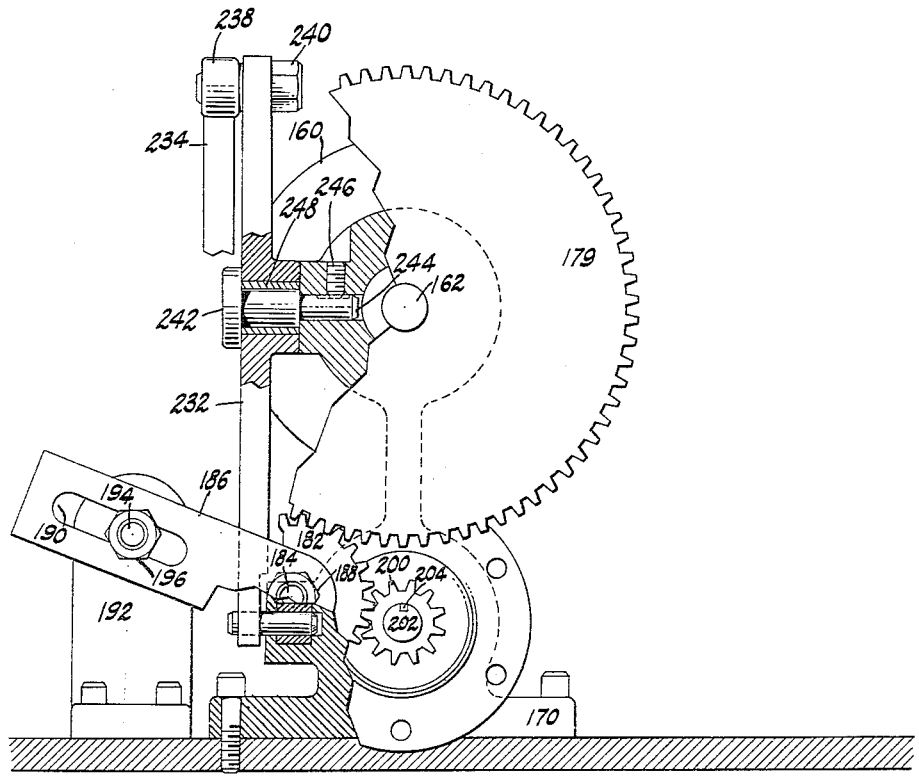
FIG. 7 is an end view of the apparatus of FIGS. 5 and 6 in partial section with some parts broken away showing the transmission between the Geneva indexing mechanism, the lead screw and the lead screw locking mechanism.
Figures 8, 9:
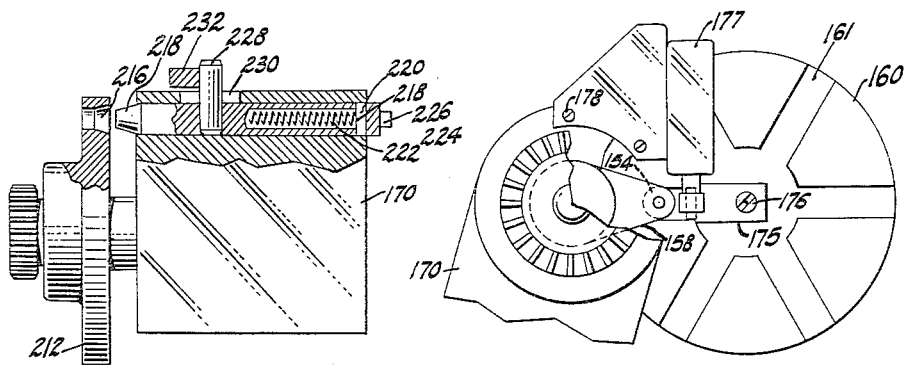
FIG. 8 is an enlarged view of the lead screw locking mechanism of FIG. 7.
FIG. 9 is an end view of a portion of the indexing mechanism showing the Geneva wheel and operator.
Figure 10:
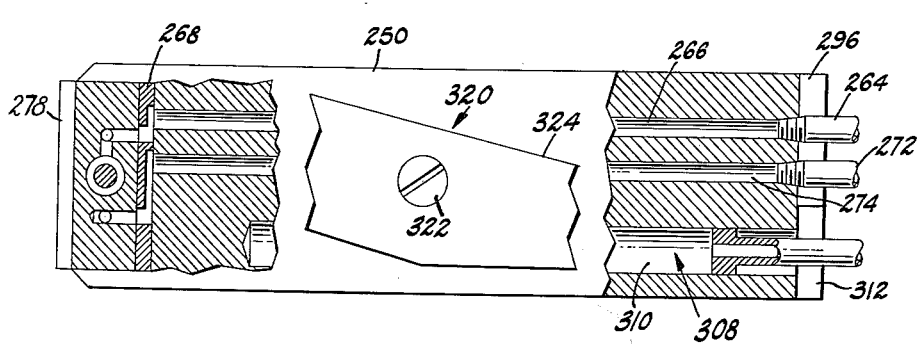
FIG. 10 is a plan view in partial section of the movement proportioning carriage showing the return means and the passageways for controlling the lead screw engaging and disengaging means.
Figures 11, 12:
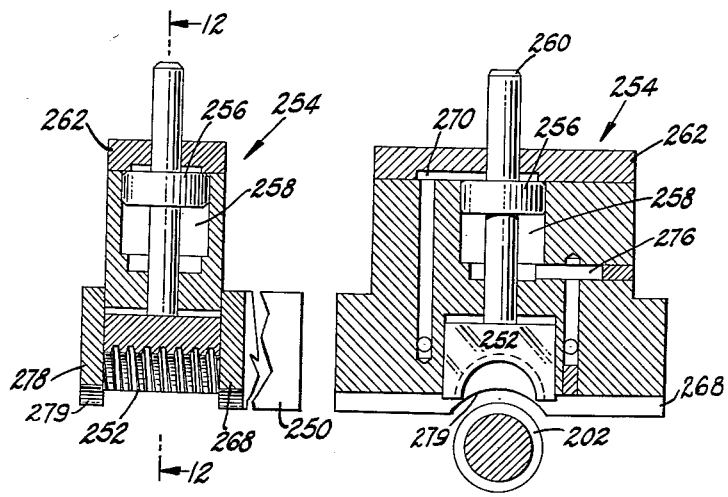
FIG. 11 is a side elevation in partial section showing the half nut for engaging the movement proportioning means to the lead screw.
FIG. 12 is an end view in section along line 12—12 of FIG. 11 of the half nut operating apparatus and showing the connections made thereto.

A locking wheel 212 is affixed to the lead screw shaft 202 between the gear 200 and the bearing 206 and is held in position by a set screw 214 (see FIGS. 7 and 8). The locking wheel has a plurality of frustro-conical shaped passageways or recesses 216 radially spaced about its circumference. These recesses cooperate with a pin 218 to prevent the movement of the lead screw between indexing movements. The locking pin 218 is slidably mounted in a recess 220 in the support 170 and is urged toward its extended position by the operation of a spring 222 mounted within the pin 218 against stop 224. The stop is secured to the support 170 by screws 226. An arm 228 mounted on the locking pin 218 extends beyond the support 170 through a slot 230 in its wall.

The lock pin 218 may be withdrawn from the recesses 216 in the wheel 212 by movement of the locking lever 232. This lever is operated by a cam 234 fastened to the secondary drive shaft 118 by a screw 236. The contour of the cam is followed by a roller 238 affixed by a nut 240 to one end of the locking lever 232 which is pivoted at its center on a formed pin 242. The pin 242 is held in a recess 244 in the support 170 by a set screw 246. Bearing 248 is provided between the formed pin in a locking lever to insure the smooth movement of the lever.

*Sine Bar Carriage*

The indexing rotation of the lead screw 202 is transmitted to the frame carrier 100 through a sine bar carriage 250. This carriage is slidably mounted in the multiple slide way 210. A controlled copulation between the sine bar carriage and the lead screw 202 is affected by a half nut 252 (see FIGS. 6, 10, 11 and 12), and is controlled by the fluid motor 254. This fluid motor has a piston 256 slidably mounted in an internal cavity 258 and is attached to the sine bar carriage 250 by conventional means. Attached to this piston is a piston rod 260, one end of which extends beyond the cover portion 262 of the fluid motor, while the half nut 252 is affixed to the other. This construction allows the operator to determine by visual inspection whether the half nut motor has been operated. Fluid pressure is admitted to the half nut from a source, not shown, through flexible hose 272 and passage 274 which extends the length of the sine bar carriage 250. A plate 268 is positioned at the motor end of the passage to direct the fluid pressure into the passage 270 which terminates in the cavity 258 at a point above the piston 256. The pressure causes the piston and associated half nut 252 to descend thus engaging the sine bar carriage with the indexing lead screw 202. To effect the disengagement of the sine bar carriage from the lead screw in pressure may be admitted through flexible conduit 264 to passageway 266 which extends parallel to the passageway 274 previously described. This passageway also terminates in the plate 268 which conducts it to a passage way 276 in the fluid motor 254. This passageway enters the cavity 258 at a point below the bottom most position of the piston 256. Fluid pressure causes the piston to rise raising the half nut 252 and dis-engaging it from the lead screw 202. The lower portions of plate 268 and plate 278 also serve as guide means for the half nut 252 and prevent its rotation about the piston rod 260. These plates 268, 278 are provided with recesses 279 through which lead screw 202 passes.

Sine Bar Rapid Advance and Retract

Figure 6:
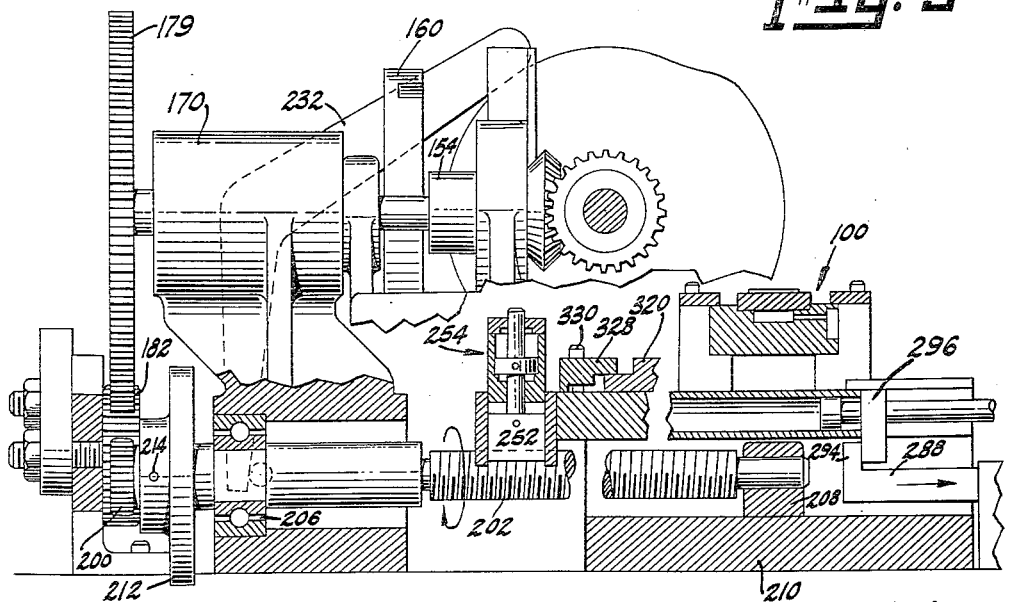
FIG. 6 is an elevational view of the apparatus of FIG. 5.

The half nut might be used to cause the complete travel of the sine bar carriage through a complete cycle. This, however, would considerably lengthen the required time for producing a grid. Therefore, means are provided to bring the sine bar carriage from a rest position to the position where it engages the frame carrier slide without relying on the indexing lead screw. This means comprises (see FIGS. 1, 6 and 13) a fluid motor 280 which is affixed to a support member 282 having slide way 284 formed as a part thereof. The support is fastened to the platform 114 by screws 286. A substantially L-shaped slide 288 is positioned in the slide way 284 where ram 290 of the fluid motor 280 contacts an adjustable stop 292 on the slide. A shoulder 294 at the end of the slide 288 contacts a plate 296 mounted on the end of the sine bar carriage 250 (see FIG. 6). When the fluid motor is energized the ram 290 causes movement of the slide toward the right as indicated in FIG. 6 against the force of slide return spring 298. The return spring is mounted at one end on the support 300 provided for the limit switch 302. This support is attached on the platform 114 by screws 304. Limit switch 302 is tripped by the stop 306 when the rapid transfer slide is in its most extended position. The function of this and other limit switches will be later described. When the sine bar carriage has advanced to the start position the half nut engages the lead screw and advances the sine bar slide through the working portion of the cycle in which a grid is produced as will be described, it becomes necessary to return the sine bar slide to its rest position. Fluid motor means 308 (see FIG. 10) performs this function and comprises a closed end cavity or passageway 310 formed in the sine bar slide parallel to the longitudinal axis of the slide. A combined piston, piston rod and fluid pressure inlet 312 is affixed at its exposed end 318 to the platform 114 by a bracket 314 and screws 316. Fluid pressure is admitted through the exposed end to the cavity after the half nut is dis-engaged from the lead screw causing the sine bar slide to return to the rest position.

The sine bar or ratio bar 320 is mounted on the carriage by a screw 322. The position of the sine bar i.e., the inclination of its edge 324 with respect to its direction of travel may be varied. A follower 326 affixed to the frame carrier slide 100 rides on the edge 324 of the sine bar. Since the direction of travel of the sine bar slide and the frame carrier slide are at right angles to one another the angle formed between the plane of the edge 324 and the longitudinal axis of the sine bar slide will determine the proportioning factor to be used in determining what part of the discrete increments of the longitudinal movement of the sine bar carriage 250 produced by the rotation of the lead screw 202 will be imparted to the frame carrier slide 100. The sine bar is locked in the desired position on the carriage by a clamp 328 which is operated by screw 330 (see FIGS. 6, 13).

Referring to FIG. 13, the sine bar carriage is slidably retained in the slideway 210 by hold down plates 332 which are fastened to the slideways by screws 334. Limit switch 336 mounted on bracket 338 is held to the platform 114 by screws 340 which pass through adjusting slots 342 adjacent the path of the sine bar carriage 250. The lever 344 for limit switch 336 is operated by an adjustable stop 346 carried by a plate 348 fastened by a screw 350 to the end of the carriage. Another limit switch 352 is mounted adjacent the path of the slide on a bracket 354 by screws 356 and is adjustably secured to the platform 114 by screws 358 which pass through the slots 360 provided in the bracket 354. The operator 362 for limit switch 352 rolls on the side of the slide. Yet another limit switch 364 is also mounted adjacent the path of the slide on a bracket 366. This bracket is provided with adjusting slots 368 through which the screws 370 pass to fasten it to the platform. The operator 372 of limit switch 364 is also activated by slide 250. The functions of these and other limit switches will be explained in the discussion of the mode of operation of the apparatus.

The Frame Carrier Slide

Referring to FIGS. 13, 14, 15 and 16, the frame carrier slide 100 which is mounted in the slideway 210 has a cavity 374 provided in its upper surface. The holder 376 for the grid blank 104 conforms to the contour of the particular grid being made and is removably held by screws 378 on a ledge 380 formed in the wall of the cavity so that it may be replaced when the grid type is changed. The slide 100 is provided with an elongated recess 382 in one side which communicates with the cavity 374 through a passageway 384. Slide retaining plates 386 are secured to the slideway 210 by screws 388. A passageway 390 is formed in one side of the slideway 210 and is so positioned that when the slide frame 100 is advanced it will communicate with the recess 382 in the side of the slide. This passageway is connected by flexible hose 392 to a source of suction, not shown. Thus the suction may be applied to the cavity 374 through the communicating series of passageways and recesses.

The grid holder 376 which is positioned and retained in the cavity is provided with a plurality of holes 394 and slots 396. These holes and slots communicate with the cavity and when suction is applied thereto will serve to retain a frame placed upon the holder in its desired position. The vertical movement of the blank is restrained by the force of the suction when at the work station. The relative position of the raised portions 398, the holes 394 and the slots 396 are of course dependent upon the type of grid being manufactured. When the grid type is changed it is merely necessary to remove the holder 376 and replace it with one having the proper configuration of these elements.

Referring to FIGS. 13 and 18, the sine bar follower 326 is supported in one leg 400 of an L-shaped member 402 which passes through an aperture 404 in the carrier 100. The L-shaped member is adjustably retained on the carrier by bolts 406 which pass through a coverplate 408 and through two slots 410 in the L-shaped member. The position of the leg 400 of the L-shaped member 402 in the aperture 404 is adjusted by means of a plate 412 fastened to the carrier 100 by a bolt 414. The adjustable stop 416 threadably engages the plate 412 and also engages the L-shaped member and when the bolts 406 are loosened, movement of the stop 416 will change the position of the sine bar follower 326 which is mounted on a bolt 418 that passes through the leg 400. The bolt is provided with a shoulder 420 which abuts the end of the leg and the follower is retained between the end of the leg and the head 422. The bolt is held in place by a nut 424. A fluid motor 426 serving as an air spring is mounted on a bracket 428 positioned relative to the apparatus by screws 430 which pass through the bracket to the platform 414. The ram 432 of the air spring is fastened by screw 434 to the slide 100. When air pressure is applied to the air spring 426 it applies a retracting force on the slide 100, the function of which will be later explained. Another fluid motor 436 is mounted adjacent the air spring 426 and is so positioned that when fluid pressure is applied thereto its ram 438 will contact the slide 100 and cause it to advance against the restraining action of the air spring 426. The air cylinder 436 is mounted on a bracket 440 which is fastened to the platform 114 by screws 442. A spring 444 about the ram 438 acts between the slide 100 the ram 438 and tends to return the ram to its initial retracted position.

Limit switch 446 has an operator 448 which contacts the follower 326 and is positioned by screws 450 passing through bracket member 452. This bracket is in turn fastened to bracket 428.

Wire Feed Mechanism

Referring to FIGS. 1, 16, 17 and 23 the wire feed means generally indicated at 108 in FIG. 1 comprises means 454 for grasping and guiding the lateral wire 110 mounted upon a slide 458 which is operated by a cam 460 on the secondary drive shaft 118. The lateral wire supply 462 is mounted adjacent the slide 458 on the support 464. The grasping and guiding means is located adjacent the wire fastening means 112 so that a straight line reciprocating motion of the slide 458 will feed the wire across the grid frame 104 into a previously formed notch in the frame.

The slide 458 is retained in the slideway 463 which is a part of the main work station support 464 by retaining plates 466 and screws 468. An arm 470 is attached to one end of the slide by conventional means. Connected to this arm is a link retainer 472 which holds one end of an adjustable connecting rod 474 which passes through an opening 475 in the support 210. The other end of the connecting rod 474 is attached to a cam follower 476 by a link retainer 478. The ends are so fashioned that adjustments in the length of the member between ends may be made easily and accurately. The cam follower 476 is pivoted on a pin 480 in the arm 482 attached to the slideway 220 by bolts 484. The roller 486 mounted on the cam follower 476 is caused to follow the contour of cam 460 by the action of a spring 488 which is mounted between the cam follower and a bracket 490 fastened to the platform 114 by bolts 492.

Wire feed lock out lever arm 494 is pivoted on a pin 496 attached to a portion of the bracket 492 and one end of this lever arm contacts the armature 498 of a solenoid 500. This solenoid, when activated, causes the lever arm to pivot about its pin 496 against the action of a spring 502. This movement is limited by a stop 504 which may be locked in position by a nut 506. When the armature is energized, by means later explained, it causes the arm to pivot bringing the free end of the arm in contact with the cam follower 476 and restraining its movement. The wire feed mechanism is thus disabled for the period in which the solenoid is energized. As shown in FIG. 16 the armature is extended and the wire feed mechanism is stopped. A limiting stop 508 for the armature is mounted on a bracket 510 attached to bracket 490 by a bolt 512. The stop 508 limits the travel of the lever arm 494 by limiting the movement of the armature and may be adjusted by nut 514.

Referring to FIG. 23, the wire gripping means 454 has a body member 516. Formed as a part of this member is one of the gripper fingers 518 which has a flat 520 on its upper surface. A groove 522 through which the wire 110 passes is formed in the end of the finger. A movable finger 524 is pivoted on the body portion 516 upon a pin 526. This finger is constructed similarly to the fixed finger 518 in that it is provided with a matching groove 528 in its free end. The groove 522 and the groove 528 are shallow, partially semi-circular and form an opening having an adjustable clearance between them with respect to the diameter of the lateral wire 110 so that when the fingers are clamped together the wire will be retained therebetween and when the clamping force is removed the grooves will serve as a wire guide. As an alternative to this guiding means a ledge may be provided on one finger which extends into a recess in the other finger. The wire then rides on the ledge when not clamped between the fingers. The movable finger is caused to pivot by a fluid motor 530 which is mounted on the body portion 516 by a screw 532. Ram 534 of the air motor 530 is attached to an arm 536 on the movable finger 524. The fluid motor 530 clamps the wire 110 between the fingers. The spring 538 between the body of the fluid motor and the arm 536 maintains a slight pressure on the fingers when the fluid pressure on the fluid motor 530 is relaxed. The pressure keeps the wire from sliding out of the groove but allows the wire to slide on the fingers. The amount of separation of the fingers when fluid pressure is applied is controlled by an adjustable stop 539 in the fluid motor 530 which limits the movement of the ram 534.

Referring to FIGS. 13, 16 and 23, the body member 516 of the wire clamp and guide is pivoted on the slide 458 on a pin 540 and is retained on the pin by a nut 542. A torsion spring 544 is positioned about the pin 540 between the body 516 and the nut 542, and urges the free ends of the fingers upwardly. Solenoid valve 546 is mounted adjacent the slideway 463 on the support 464 and is connected to the air motor 530 which it controls by a flexible conduit 548.

The lateral wire supply 462 comprises a spool 550 of the wire 110 mounted on an arbor 522 affixed to the shaft 554 of a motor 556 which is electrically connected so that the normal direction of rotation of the arbor is counter to the direction in which the wire is fed off the spool, thus tensioning the wire. The spool is clamped to the arbor 552 by an arm 558 which is secured to the arbor by a screw 560. Electric motor 556 is mounted on a bracket 562 attached to the support 464 by screws 564.

The wire is fed from the spool to a first pulley 566 mounted on a platform 568 which is pivotally supported on the slide 458 by a screw 570. A torsion spring is mounted about the screw 570 between the platform 568 and the slide 458 and tends to rotate the platform in a counterclockwise direction (see FIG. 16). The wire passes from about the first pulley 566 to a second pulley 574 mounted on the platform and then to a pulley 576 mounted on the slide 458 adjacent the gripping means 454. From the pulley 576 it is led within the grooves 522, 528 of the gripping and guiding fingers.

Hold Down Paddle

Referring to FIGS. 1, 13, 18, 23, a hold down member 578 is provided to position the wire gripping and guiding means 454 so that the lateral wire 110 will be properly placed for attachment to the grid blank. The hold down paddle or member 578 is provided with a substantially T-shaped arm 580 which contacts the flat surface 520 on the gripping finger 518. This arm is attached to the hold down member 578 by screws 582 (see FIG. 18). The end of the arm 580 which attaches to the member 578 cooperates therewith to form a pivot about a pin 584 which is affixed to the work station support 464. A second pivot for the member is formed by one end of a lever 586 which is attached to the member by screws 588 and the member in a similar manner (see FIG. 1). A cam follower 590 is affixed to the free end of lever 586 and rides in a groove 592 in a cam 594 mounted on the main drive shaft 116. The lever 586 is reinforced by a member 596 having a generally triangular shape. Thus the movement of the T-shaped member 580 and subsequently the vertical movement of the wire feed fingers 454 is controlled by cam 594. This motion is synchronized with the gripping and guiding function of the wire feed fingers as will be explained later.

Lateral Wire Fastening Means

Referring to FIGS. 1, 18, 19, 20, 23, the position of the fastening means 112 is indicated in FIG. 1. The embodiment of the invention shown employs notching and peening tools which are adjustably mounted on slides held by the support 464. These slides are operated by cams on the main drive shaft 116.

The notching and peening tools on each side of the grid operate in pairs and are spaced apart the distance between adjacent lateral wires. The left bead of the grid blank is simultaneously notched and peened and this is also true of the right bead of the grid.

As shown in FIG. 23 the left notching tool 598 is formed with a chisel like end 600 which forms the notch 135 when pressed with sufficient force against the bead 128. The left peening tool 602 has a flat 604 on its end which forms the peen 136 for anchoring the lateral wire 110 in place. These contours are substantially duplicated in the corresponding right notch 606 and peening 608 tools. All the tools are adjustably mounted so that the distance between tools operating on the same bead and the distance between corresponding tools operating on the opposite beads may be adjusted to provide the desired lateral wire placement on frames having a different configuration and number of lateral wires per inch.

The tools are each clamped in position in similar holders 610 by the cooperation of a movable block 612 and the holder by screws 614 (see FIG. 20). The holder may be moved to adjust the separation of the notching and peening tools on the same side. Adjustments are made by loosening the locking screws 616 (see FIG. 18) which allow the tool to be positioned by movement of screws 618 affixed to the plate 620. Movement of the holder relative to the locking screws 616 is possible due to the provision of slots in the holder 610 which are behind the plate 622.

The screws 616 also affix the holder 610 to member 624 which is substantially L-shaped. This member is adjustably attached, in the case of the left notching tool 598, to one end of the slide 626 by bolts 628 which pass through a cover plate 630 and slots 632 in the member. The position of the L-shaped member on the slide 626 is accurately controlled by screws 634 affixed to a plate 636 which is attached to the slide by screws 638. The other tools are attached in like manner to their appropriate slides e.g. left peening tool 602 is attached to slide 640, the right notching tool 606 is attached to slide 642, the right peening tool 608 is attached to slide 644.

Referring to FIGS. 1, 18 the slides, which operate simultaneously on one bead of the frame grid blank as for example the right bead, are tied together at their free ends. The relative position of the slides 642, 644 with respect to the tie member 646 may be adjusted by the bolts 648 and 650. Retaining link 652 is attached to the head 646 and adjustable connecting rod 654 connects the link to a second retaining link 656 mounted on one end of a lever 658. This lever is pivoted about a shaft 660 held by its ends in the support 464. Cam follower 662 is attached to the free end of the pivoted lever 658 and is constrained in a groove in cam 664 which is mounted on the main drive shaft 116. The left slides 626, 640 are tied together in a similar fashion by a header 666 which is connected by rod 668 to lever 670. This lever is also pivoted about the shaft 660. A follower 672 is attached to the free end of the lever and rides in a groove 674 in cam 676 affixed to the main drive shaft 116. The operation of the two sets of slides is coordinated by angular adjustment of the cams 664, 676, on the shaft 116.

Lateral Wire Cut Off

Referring to FIGS. 1, 18, 23, cut-off means 678 are provided to sever the lateral wire 110 after it has been anchored by peening in the second or right bead. The cut-off tool 678 has a cutting head 680 mounted on an arm 682. The cutter 678 is adjustably affixed by screw 684, which passes through a slot 686, to a slide 688 held in the support 464 by retaining plates 690 and screws 692. This slide is operated by a cam 694 mounted on the main shaft 116. A follower 696 is attached to a lever arm 698 which is pivoted at one end by pins 700. The pin is held in support 702 which is affixed to the platform 114 by screws 704. The free end of the lever 698 is connected to the slide through an adjustable link 706 attached to the lever arm by retainer 708 and to the slide by retainer 710. An adjustable stop 712 is mounted on the slide and cooperates with a projection 714 on the support 464 to limit the downward travel of the slide. The lateral wire 110 is severed by the guillotine action of the cutting head 680 against the grid blank 104 adjacent the bead.

Side Tension Means

Figure 21:
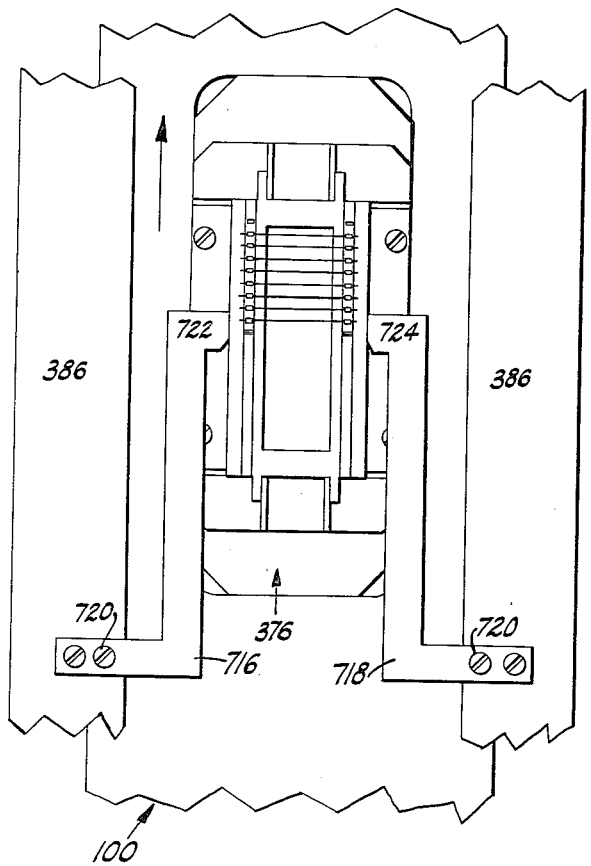
FIG. 21 is a fragmentary plan view of the grid side flexing means shown with an enlarged and simplified grid in partially completed condition.

Since the lateral wires 110 are applied to the grid blank under tension and since a considerable number of lateral wires per inch are attached to the grid blank 104, unless special precautions are taken, bowing of the side portions due to the tension on the wires will cause wires between the center and the ends to become loose and to sag. In order to prevent this from occurring, pretension means are applied as the grid is fabricated. In the embodiment shown in FIG. 21 a pair of somewhat resilient fingers 716, 718 fabricated from heavy spring stock are affixed by screws 720 to the slide retaining plates 386. The beveled ends of the fingers 722, 724 are spaced apart a distance less than the width of the grid frame 104 and are positioned so that the center line through the fingers is at the point where the lateral wire 110 is attached to the grid blank. The effect of these fingers is to cause the side portions 132, 133 of the grid to flex toward one another, placing tension on the lateral wires due to the spring back of the frame when the grid is released, by causing a reduction in the width of the aperture 129 or distance between the beads 126, 128 at the time the lateral wire is attached. The ends of the fingers slide along the side of the frame blank as it is moved through the fastening position causing progressive flexing of the side portions toward one another in the same plane. When the grid blank is completed and withdrawn from between the fingers the natural resilience of the frame material causes all the lateral wires to be kept tensioned.

Drive Mechanism

As previously described, the secondary drive shaft 118 is journaled at one end in the support 137. The other end of the shaft, to which is affixed a gear 726, is journaled in a second support 728. The main drive shaft 116 is also journaled in support 728. The gear 730 is affixed to this shaft and meshes with the gear 726 on the shaft 118. The other end of the main shaft 116 is journaled in a support 732 which is affixed to the platform 114. A brake mechanism 734 is mounted about the main drive shaft adjacent the support 732 and is attached to the support. The function of this brake will be later explained. An electrically operated clutch 736 is mounted between the connecting shaft 738 and the main shaft 116. Thus when rotation is imparted to the connecting shaft 738 it drives the main shaft 116 when the clutch 736 is energized. The main shaft 116 in turn drives the secondary shaft 118 through the gearing arrangement 726, 730.

Operation

The operation of the subject apparatus may be best understood by the illustration of the apparatus as applied to the production of a frame grid. A typical frame grid blank 104 may be fabricated from substantially flat sheet steel in a process which produces the general configuration of the grid and the raised beads 126, 128 which are .030" wide by .017" high above the frame 104. The central aperture 129 is 1.02" long by .210" wide, with 50 nickel lateral wires having a diameter of .003" required across the aperture. The spacing between centers of the lateral wires is .0200±.0005".

The operation is started with the sine bar slide 250 and the grid chuck slide 100 in their withdrawn positions. At this time the brake 734 is energized and the clutch 736 is de-energized thus all cams and tools are maintained in a deactivated position although the connecting shaft 738 is rotating continuously. The grid blank 104 is placed in a grid holder 376 of suitable design on the grid chuck slide 100. At this time it is held in position by the frame stops 398 on the holder. The cycle of operation is started allowing air pressure to be admitted to the chuck slide advancing cylinder 436. Sufficient pressure is applied so that the slide is advanced over the retracting force applied by the air spring 426. Movement of the frame slide 100 to a position within the work station activates limit switch 446 positioned beneath the slide. This limit switch controls the sine bar advance cylinder 280. Fluid pressure is then applied to the cylinder 280 which causes the ram 290 to advance the slide 288 and rapidly traverse the sine bar slide 250 to the start of its working position. When the sine bar slide 250 arrives at its working position limit switch 302 is operated which causes the half nut cylinder 254 to operate causing the half nut 252 to engage the lead screw 202. At this time the fluid pressure on frame slide advance cylinder 436 is released and the retracting cylinder 426 brings the sine bar follower 326 into contact with the edge 324 of the sine bar 320. When the sine bar has been advanced to its working position and contact has been made between the sine bar and follower the operator 362 on limit switch 352 drops off the end of the slide 250. Activation of this limit switch causes the clutch 736 to become engaged and the brake 734 to be de-energized thus freeing the shaft for rotation and connecting both to the sources of motive power.

Referring to FIG. 13, when the frame slide has been advanced to its working position, the recess 382 in the side of the slide 100 is in registration with the suction port 390 by means of which suction is applied to maintain the grid blank in the holder 376. The advance of the frame slide also forces the grid frame between the fingers 722, 724 of the frame side tensioning means.

Rotation of the secondary drive shaft 118 causes the Geneva locking wheel 212 to be freed for rotation by the withdrawal of the lock pin 218 due to the action of cam 234 on the lever 232. The continued rotation of the secondary drive shaft 118 and Geneva operator 154 causes the Geneva wheel 160 to index once before the locking wheel 212 is again engaged. This momentary rotation is imparted to the lead screw through gears 179, 180, 200 and is transmitted to the sine bar as a longitudinal movement through the half nut 252. Due to the utilization of the sine bar between the slides 250 and 100 only a portion of the movement of the sine bar slide 250 is converted into movement of the frame slide thus in effect proportioning the movement of the slide 100 to the movement of the sine bar.

For a better understanding of the operational sequence once the grid blank is in position reference should be made to the timing charts on FIG. 25.

In starting a grid the lateral wire feed means 108 must be restrained from operation until the tools operating on both beads have completed one cycle of operation. This is required since the wire feed means feeds the wire across the grid at the position where it would normally be peened into a previously formed notch. Since no notch is present when the grid is started it is necessary to produce one on each bead.

Due to the use of the Geneva mechanism the frame blank is held stationary while cam shafts 116, 118 rotate. The wire feed mechanism 108 is deactivated by the operation of solenoid 500 which is controlled by limit switch 364 mounted adjacent the sine bar slide 250 where it senses from the position of the slide that the first notch is to be produced. Solenoid 500 when energized pivots lever 494 so that its end contacts the cam follower 476 and prevents the cam follower from following the contour of the cam 460 which is mounted on the shaft 118 thus preventing the wire feed from functioning.

The rotation of the cam 664, 676 by shaft 116 causes the operation of the left and right pairs of notching and peening tools producing the desired first notch on each bead. Although the hold down paddle 580 and lateral wire cut off means 678 function normally at this time they are ineffectual since the wire feed has been deactivated.

Continued rotation of the shaft 118 causes the Geneva indexing means and the lead screw 202 to be unlocked and indexed. This stepped motion is transmitted to the sine bar slide 250 and thence to the frame slide 100. The movement of the sine bar carriage causes the operator 372 of the limit switch 364 to fall off the slide which opens the switch and de-energizes the solenoid 500. The lever 494 is then returned to its normal position by spring 502 allowing the cam follower 464 to contact the wire feed cam 460.

The movement of the frame slide 100 positions the frame blank 104 beneath the work station for the placement of the first lateral wire 110. The increments of movement of the blank 104 and the spacings between the notch and peen tools operating on each bead correspond to the distance between centers of the successive lateral wires. The respective sets of left and right tools are positioned so that they are aligned with the corresponding tools operating on the opposed side transverse to the grid above the beads.

At a time shortly before the grid has come to rest the wire feed mechanism begins to function moving the wire grasping and guiding means 454 across the grid. The end of the lateral wire 110 protrudes a short distance beyond the ends of the fingers 520, 524 between which it is clamped in the guide grooves 522, 528. The ends of the fingers are inclined upwardly due to the action of the spring 546 so that they clear the right bead 126 as they pass over it to a position adjacent the notch in the left bead 128. (See FIG. 22.)

The movement of the slide 458 with the end of the wire 110 clamped between the fingers causes the lateral wire to be stripped from the spool 550 against the tensioning effect of the motor 556. The pulleys 566, 574 and the spring on the platform 568 act as a take-up unit to prevent a shock from being transmitted to the wire 110 during the advancement or retraction of the slide.

When the fingers 520, 524 have approached the left bead 128 on the then stationary frame, the paddle or hold down lever 578 is operated by cam 594 on the drive shaft and the head 580 of the lever depresses the fingers laying the end of the wire 110 in the previously formed notch in the bead. The left pair of tools 598, 602 descend due to the action of cam 676 on the main shaft. The peening surface 604 on the peen tool 602 closes the material of the bead over the end of the wire 110 positioned in the groove. Simultaneously the notching surface 600 opens the next notch in the bead. The tools are then retracted and at the same time the gripping force applied to the fingers by the air motor 530 is relaxed. The wire is not completely released but is allowed to strip from within the grooves 522, 528 in the fingers as they retract. As the fingers approach the right bead 126 the paddle cam raises the hold down lever 578 allowing the fingers to lift above the bead. After the bead has been cleared the paddle depresses the fingers so that the lateral wire is laid in the previously formed notch. The fingers then clamp the wire once again and remain clamped and in position adjacent the bead until the next lateral wire is to be placed. After the wire 110 has been placed in the notch in the right bead, the right set of tools is caused to descend by the action of cam 664 mounted on the shaft 116. The peening tool 608 peens the wire into the notch while at the same time the notching tool 606 forms the notch to be used for the next lateral wire.

When the wire has been secured to the right bead 126 the cut off means is activated by the cam 696. This causes the cut off tool 678 to descend severing the wire between its cutting edge 680 and the grid frame 104. The depth of penetration of the cutting edge is accurately controlled by a stop 712 on the cut off slide 698 so that it does not cut deeper than required to sharply sever the wire. The end of the wire left projecting from the fingers will be peened into the left notch on the next operation. The length of wire protruding is dependent upon the horizontal adjustment of the cutting tool.

The frame slide is advanced one step again by action of the Geneva mechanism and the above described cycle is repeated. Advancement of the frame step by step and the application of the lateral wires in sequence continues as the prescribed number of lateral wires are attached. As the grid is advanced through the work station the side tension fingers 722, 724 slide along the side of the frame causing the flexing of the side portions 132, 133 between the top and bottom members of the grid. Flexing of the sides toward one another in the same plane temporarily reduces the width of the aperture slightly so that when the sides are released after the grid is completed the resilience of the sides will additionally tension all the lateral wires. In some applications this is necessary so that sagging of the lateral wires attached between the center of the grid and the ends thereof will be minimized. This sagging occurs when a plurality of tensioned lateral wires are applied causing the slide members of the grid to flex.

When the frame slide 100 has been advanced to place the last lateral wire on the grid, the operator 344 of the limit switch 336 is operated by the adjustable stop screw 346. The last lateral 110 is then attached to the frame and when the rotation of the Geneva wheel 160 starts for the next advance of the frame the limit switch 177 is activated by the cam 175 affixed to the Geneva wheel. This limit switch 177 acts with the limit switch 336 on the slide to disengage the clutch 736 and engage the brake 734 thus stopping the main shaft 116, secondary shaft 118 and associated tooling and wire feed cams. At the same time the half-nut 252 is withdrawn from the lead screw 202 and fluid pressure is applied to the sine bar return cylinder 308 causing the sine bar slide 250 to retract to its start position. When the sine bar slide retracts the air spring 426 returns the frame slide 100 to its loading and unloading position. In this position the suction holding the frame in the grid holder is released and the completed grid may easily be removed.

Since the cam 175 on the Geneva wheel 160 stops the apparatus in the same position after each cycle, the lateral wires of subsequent grids are placed in the same position on their frame as on the first grid. Grids which are produced by this apparatus are extremely useful in tubes employing line-up type grids since the position of the lateral wires on succeeding grids is so closely controlled. The position of the lateral wires with respect to the bottom or top of the grid frame as a reference is the same and no vertical adjustments are required in the finished tube.

Although several embodiments of the invention have been shown and described it will be apparent to those skilled in the art that various changes and modifications may be made therein without departing from the scope of the invention as defined in the appended claims.

Having thus described our invention we claim:

1. An apparatus for manufacturing a frame grid having a plurality of lateral wires affixed across a frame having opposed side portions comprising; means for holding said frame, means for sequentially advancing said frame holding means, means for feeding and attaching a plurality of lateral wires one at a time to said frame while in said holding means intermediate said sequential movements, and means for flexing said opposed side portions of said frame toward one another while in said holding means when said wires are being affixed thereto whereby said lateral wires are tensioned when said frame is removed from said holding means.

2. Apparatus for progressively advancing a grid frame blank and sequentially attaching a plurality of lateral wires thereto, said grid frame blank having an aperture defined by top and bottom portions and two side portions each having a raised bead formed thereon adjacent said aperture, said apparatus having a loading and unloading station and a work-station and comprising; means for orienting and holding a grid frame blank including a frame holder having a plurality of apertures formed therein arrayed to correspond with said frame configuration and adapted to communicate with a source of vacuum, means for advancing said grid frame holding means to said work station from said loading and unloading station, means for progressive step by step advancement of said grid holding means while at said work station, means for flexing said side portions of the frame toward one another, means to sequentially attach said lateral wires to said beaded side portions while said grid is at said work station between successive advancements of said grid, and means to return said grid holding means to said loading and unloading station upon completion of said grid at said work station.

3. Apparatus for progressively advancing a grid frame blank and sequentially attaching a plurality of lateral wires thereto, said grid frame blank having an aperture defined by top and bottom portions and two side portions each having a raised bead formed thereon adjacent said aperture, said apparatus having a loading and unloading station and a work station and comprising; means for holding said grid frame blank, means for advancing said grid frame holding means to said work station from said loading and unloading station, means for progressive step by step advancement of said grid holding means while at said work station, means to flex said side portions toward one another while in said holding means while said frame is at said work station, means to sequentially attach said lateral wires to said beaded side portions while said grid is at said work station between successive advancements of said grid and while said side portions are flexed, and means to return said grid holding means to said loading and unloading station upon completion of said grid at said work station.

4. Apparatus for progressively advancing a grid frame blank and sequentially attaching a pluraltiy of lateral wires thereto, said grid frame blank having an aperture defined by top and bottom portions and two side portions each having a raised bead formed thereon adjacent said aperture, said apparatus having a loading and unloading station and a work station and comprising; means for holding said grid frame blank having a follower thereon; means for advancing said grid holding means to said work station from said loading and unloading station; means for progressive step by step advancement of said grid holding means while at said work station including, a lead screw, indexing means operably connected to said lead screw to cause intermittent rotation thereof, a carriage, means on said carriage to selectively engage said lead screw, movement proportioning means mounted on said carriage to engage said follower on said grid holding means while at said work station whereby step by step movement is imparted to said grid holding means; means to sequentially attach lateral wires to said beaded side portion of said grid while said grid is at said work station between successive advancements of said grid; and means to return said grid holding means to said loading and unloading station upon completion of said grid at said work station.

5. In an apparatus for manufacturing a planar grid having a given number of lateral wires per inch from a grid frame having an aperture defined by top and bottom portions and two side portions lying in a common plane each having a raised bead formed thereon adjacent said aperture, said apparatus having a work station, a wire feed device at said work station, means for locating and advancing said frame past said work station in sequential step by step movements corresponding to said lateral wires per inch of said grid, means for operating said wire feeding device to position said lateral wires across said grid frame intermediate said sequential movement, means for flexing said side portions of said frame toward one another in said plane at said work station comprising a pair of fixed spring members adapted to slidably engage said side portions, means for affixing said lateral wires to said beaded portion of said side portion subsequent to the operation of said wire feeding means while said side portions are flexed.

References Cited in the file of this patent

UNITED STATES PATENTS

| | | |
|---|---|---|
| 1,448,566 | Muller et al. | Mar. 13, 1923 |
| 1,874,575 | Morick et al. | Aug. 30, 1932 |
| 1,934,097 | Simon | Nov. 7, 1933 |
| 2,034,653 | Flaws | Mar. 17, 1936 |
| 2,091,540 | Whiting | Aug. 31, 1937 |
| 2,176,919 | Narwid | Oct. 24, 1939 |
| 2,176,920 | Narwid | Oct. 24, 1939 |
| 2,426,522 | Porter | Aug. 26, 1947 |
| 2,451,360 | Skehan | Oct. 12, 1948 |
| 2,487,392 | Southwick | Nov. 8, 1949 |
| 2,624,100 | Foulkes | Jan. 6, 1953 |